US009745151B2

(12) United States Patent
Martel (10) Patent No.: US 9,745,151 B2
(45) Date of Patent: Aug. 29, 2017

(54) SYSTEM AND METHOD FOR DISPENSING BULK MATERIAL (71) Applicant: MATISS INC., Saint-Georges (CA)

(72) Inventor: Jacques Martel, Saint-Georges (CA)

(73) Assignee: MATISS INC., Saint-Georges (CA)

( * ) Notice: Subject to any disclaimer, the term of this patent is extended or adjusted under 35 U.S.C. 154(b) by 125 days.

(21) Appl. No.: 14/406,708

(22) PCT Filed: Jun. 14, 2013

(86) PCT No.: PCT/CA2013/050454
§ 371 (c)(1),
(2) Date: Dec. 9, 2014

(87) PCT Pub. No.: WO2013/185236
PCT Pub. Date: Dec. 19, 2013

(65) Prior Publication Data
US 2015/0191318 A1 Jul. 9, 2015

Related U.S. Application Data (60) Provisional application No. 61/660,267, filed on Jun. 15, 2012.

(51) Int. Cl.
*B65G 67/06* (2006.01)
*B65G 67/04* (2006.01)
*B65G 47/38* (2006.01)
*G01G 13/02* (2006.01)
*G01G 19/06* (2006.01)

(52) U.S. Cl.
CPC ............. *B65G 67/06* (2013.01); *B65G 47/38* (2013.01); *B65G 67/04* (2013.01); *G01G 13/02* (2013.01); *G01G 13/024* (2013.01); *G01G 19/06* (2013.01)

(58) Field of Classification Search
CPC ........ G05D 11/13; B65G 67/06; B65G 47/38; G01G 13/024; G01G 13/02
USPC ................................. 141/104, 231, 232, 284
See application file for complete search history.

(56) References Cited

U.S. PATENT DOCUMENTS

| 4,585,040 | A |   | 4/1986 | Cramer |   |
|---|---|---|---|---|---|
| 5,623,885 | A |   | 4/1997 | Haag |   |
| 5,752,367 | A | * | 5/1998 | VerMehren | ............... B65B 1/06 53/168 |
| 6,105,637 | A | * | 8/2000 | VerMehren | ............... B65B 1/06 141/129 |

(Continued)

FOREIGN PATENT DOCUMENTS

EP 0794476 A1 9/1997
EP 1707926 A2 10/2006

(Continued)

*Primary Examiner* — Gene Crawford
*Assistant Examiner* — Stephen Akridge
(74) *Attorney, Agent, or Firm* — Norton Rose Fulbright Canada LLP; Alexandre Daoust (57) ABSTRACT

A system for dispensing bulk material from storage is provided. The system comprises a plurality of stationary storage silos adapted to store the bulk material therein. A plurality of movable hoppers may be moveably positioned adjacent a bulk material chute of each storage silo to unload the bulk material therein. Once loaded with the bulk material, each movable hopper may then be positioned adjacent an input opening of a vehicle to unload the bulk material therein.

20 Claims, 7 Drawing Sheets (56) References Cited

U.S. PATENT DOCUMENTS

| | | | |
|---|---|---|---|
| 8,955,667 B1* | 2/2015 | Dibble | B65G 67/606 198/594 |
| 2005/0281641 A1* | 12/2005 | Maynard | B65G 1/1375 414/273 |
| 2006/0163283 A1* | 7/2006 | Grady | B22D 41/023 222/168 |
| 2006/0225808 A1* | 10/2006 | Baumann | G01G 19/34 141/83 |
| 2011/0214780 A1* | 9/2011 | Pahl | G01G 19/22 141/99 |
| 2012/0039694 A1* | 2/2012 | Suzanne | B65G 63/045 414/339 |
| 2012/0168355 A1 | 7/2012 | Neuwirth | |
| 2012/0189414 A1 | 7/2012 | Lukesic | |

FOREIGN PATENT DOCUMENTS

| | | |
|---|---|---|
| JP | 2007014264 | 1/2007 |
| WO | 9522042 A1 | 8/1995 |
| WO | 2010028744 A1 | 3/2010 |

\* cited by examiner

SYSTEM AND METHOD FOR DISPENSING BULK MATERIAL

TECHNICAL FIELD

The application relates generally to a material handling, and more specifically discloses system and method for dispensing bulk material from a bulk material chute to a bulk receiving area.

BACKGROUND OF THE ART

It is known to store bulk material in storage silos prior to dispensing the bulk material into transport vehicles. There remains challenges to address, however, in dispensing the bulk material from the silos into corresponding receiving areas in the transport vehicles. For instance, there remained room for improving the speed at which transport vehicles can be loaded, and improving the accuracy of the measurement of the quantity of loaded bulk material; improving access to silos; ensuring that bulk materials are not spilled into incorrect receiving areas; and managing traceability.

SUMMARY

In accordance with one aspect, there is provided a dispensing system for dispensing bulk material in a plant having a plurality of bulk material chutes above a transport vehicle area, the system comprising: at least one longitudinal guide; a plurality of transversal guides each mounted to a corresponding longitudinal guide via a longitudinal movement mechanism and being movable along a longitudinal axis, a plurality of hoppers, each hopper being mounted to a corresponding transversal guide and being movable transversally along the corresponding transversal guide via a transversal movement mechanism, each hopper having an open upper end, a chute opposite the upper end, and a gate allowing to selectively open and close the chute; and a controller configured to individually move of each of the hoppers in a hopper movement area located between the bulk material chutes and the transport vehicle area, both along the transversal axis via the transversal movement mechanism and along the longitudinal axis via the longitudinal movement mechanism, the controller being further configured to selectively open and close the gates; wherein each hopper can be moved to a corresponding position of alignment with a selected bulk material chute with its gate closed to receive a given quantity of bulk material therefrom, and then moved to a position of alignment with a selected bulk receiving area where the gate can be opened to dispense the given quantity of bulk material, independently of the movement of the other hoppers.

In accordance with another aspect, there is provided a system for dispensing bulk material, the system comprising: at least one bulk material chute; at least one set of longitudinal guides; at least one carriage mounted to a corresponding set of two longitudinal guides via a movement mechanism operable to move the carriage along the length of the corresponding longitudinal guides, each carriage having a transversal extension mechanism positioned below the corresponding longitudinal guides and operable to transversally extend and retract a distal end, and a hopper mounted under the distal end of the transversal extension mechanism via a weighing mechanism, the hopper having an open upper end, and a selectively openable and closable lower end; and a controller to control the movement of each of the at least one hopper both longitudinally and transversally via the movement mechanism and the transversal extension mechanism, respectively, and to control the selective opening and closing of the associated lower end; wherein the at least one hopper can be moved between a position of vertical alignment with the at least one bulk material chute to receive a weighed quantity of bulk material therefrom, and a position of vertical alignment with a selected bulk receiving area, at which latter position the lower end can be selectively opened to dispense the bulk material to the selected bulk receiving area, and subsequently closed.

In accordance with another aspect, there is provided a method of dispensing bulk material, the method comprising: selecting a bulk material chute amongst a plurality of bulk material chutes arranged in two parallel and adjacent rows, each row extending longitudinally; positioning a hopper below the selected bulk material chute; feeding a given quantity of bulk material form the bulk material chute into the positioned hopper, thereby loading the hopper; moving the loaded hopper in the horizontal plane, both longitudinally and transversally, into vertical alignment with a bulk receiving area; and dispensing the loaded bulk material from the hopper into the bulk receiving area.

In accordance with still another aspect, there is provided a system for dispensing bulk material, the system comprising a frame; at least one stationary receptacle fixedly mounted to the frame and adapted to store the bulk material therein, the at least one stationary receptacle having a distal end adapted to unload the stored bulk material therethrough; and a plurality of movable receptacles slideably mounted to the frame about at least one of a first and a second axis, each one of the plurality of movable receptacles comprising a body having a receiving end adapted to be positioned adjacent the distal end of the at least one stationary receptacle for receiving a stream of the stored bulk material therethrough and a bulk material chute opposite the receiving end, the bulk material chute adapted to unload the stream of bulk material therethrough.

In accordance with still another aspect, there is provided a system for dispensing bulk material, the system comprising a memory; a processor; and at least one application stored in the memory and executable by the processor for receiving a command for loading a quantity of bulk material from a stationary receptacle into a movable receptacle, issuing in response to the command a first control signal to the movable receptacle for adjusting a position thereof along at least one of a first and a second axis and positioning the movable receptacle adjacent the stationary receptacle, and issuing a second control signal to the stationary receptacle for enabling a stream of the particulate material to flow through a bulk material chute thereof into the movable receptacle.

In accordance with still another aspect, there is provided a computer-implemented method for dispensing bulk material, the method comprising executing on a processor program code for receiving a command for loading a quantity of bulk material from a stationary receptacle into a movable receptacle; issuing in response to the command a first control signal to the movable receptacle for adjusting a position thereof along at least one of a first and a second axis and positioning the movable receptacle adjacent the stationary receptacle; and issuing a second control signal to the stationary receptacle for enabling a stream of the particulate material to flow through a bulk material chute thereof into the movable receptacle.

In accordance with still another aspect, there is provided a computer readable medium having stored thereon program code executable by a processor for dispensing bulk material, the program code executable for receiving a command for loading a quantity of bulk material from a stationary receptacle into a movable receptacle; issuing in response to the command a first control signal to the movable receptacle for adjusting a position thereof along at least one of a first and a second axis and positioning the movable receptacle adjacent the stationary receptacle; and issuing a second control signal to the stationary receptacle for enabling a stream of the particulate material to flow through a bulk material chute thereof into the movable receptacle.

DESCRIPTION OF THE DRAWINGS

Reference is now made to the accompanying figures in which.

DETAILED DESCRIPTION

Figure 1:
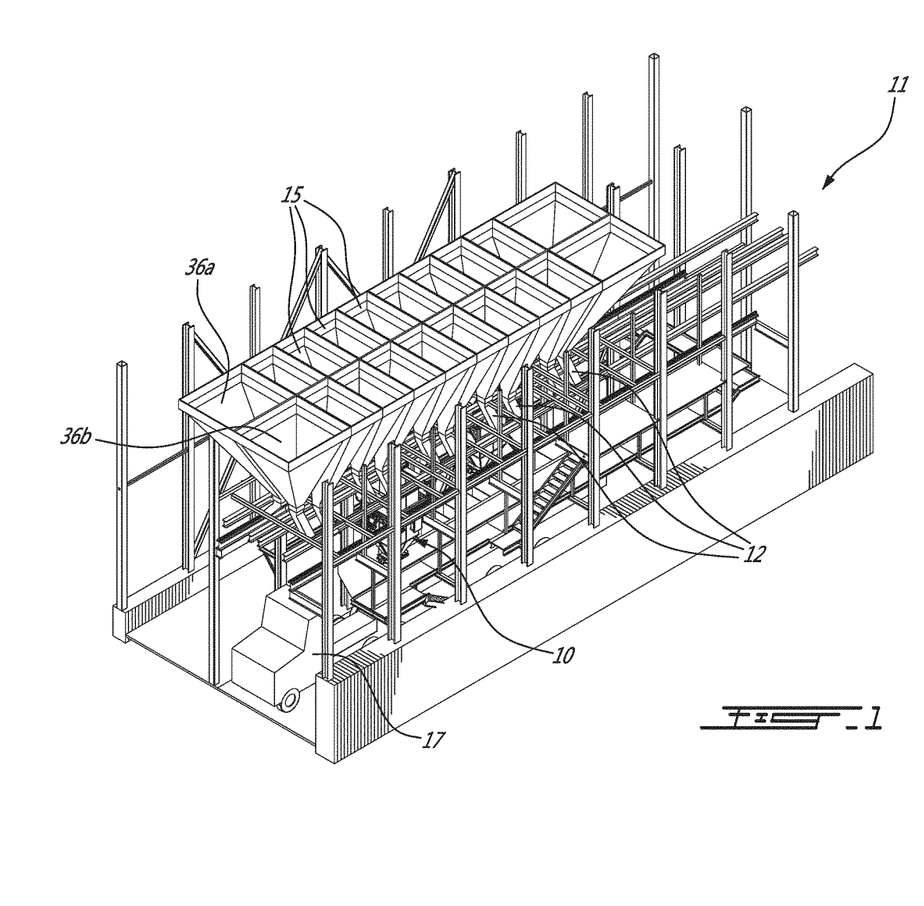
FIG. 1 is an oblique view showing a plant having a dispensing system.

Referring to FIG. 1, a bulk material dispensing system 10 used in a plant 11, such as a mill, will now be described. The plant 11 a plurality of plant chutes 12, each associated with corresponding stationary receptacles 15, typically associated to storage silos, for temporarily storing bulk material in granular or particulate form, and has a transport vehicle area 17. The bulk material can be treated grain product, sugar, sand, gravel or any other suitable material, and different chutes are typically associated to different materials. Storing a given amount of the bulk materials can allow a plant to run at a more consistent rate, and thus confer productivity, for instance. The plant chutes 12 are located above the transport vehicle area 17 of the plant 11 where a transport vehicle such as a truck (the transport vehicle can be a train or boat, for instance, in alternate embodiments) having one or more bulk material receiving area (compartments) can dock for receiving the bulk material. The dispensing system 10 can handle and convey the bulk material between the chutes and corresponding compartments of the transport vehicle. In alternate embodiments, the bulk material can be directed to suitable receptacle(s) other than a vehicle.

The bulk dispensing system 10 includes a plurality of movable distribution receptacles, referred to herein as hoppers 16, each of which is movable in two orthogonal orientations (e.g. both longitudinally and transversally) in a horizontal plane located between the bulk material chutes 12 and the bulk material receiving area. The hoppers 16 have open upper ends, and lower gated hopper chutes opposite the open upper ends. Each hopper 16 can be positioned in alignment with any one of the chutes 12 with its gated hopper chute closed, and the bulk material from the plant chute can be gravity fed into the open upper end of the hopper 16. The hopper 16 can then be moved to a position in alignment with a corresponding bulk receiving area where the gated hopper chute is open to release the bulk material into the bulk receiving area. In a preferred embodiment, the hoppers 16 are provided with corresponding scales, and are thereby configured to obtain a measurement of the weight of the bulk material received therein. When two or more hoppers are used, they can perform multiple loading and unloading operations simultaneously, which can lead to a remarkably high efficiency in loading multiple compartments of a transport materials with corresponding bulk materials from associated fixed plant chutes, for instance.

Figure 2:
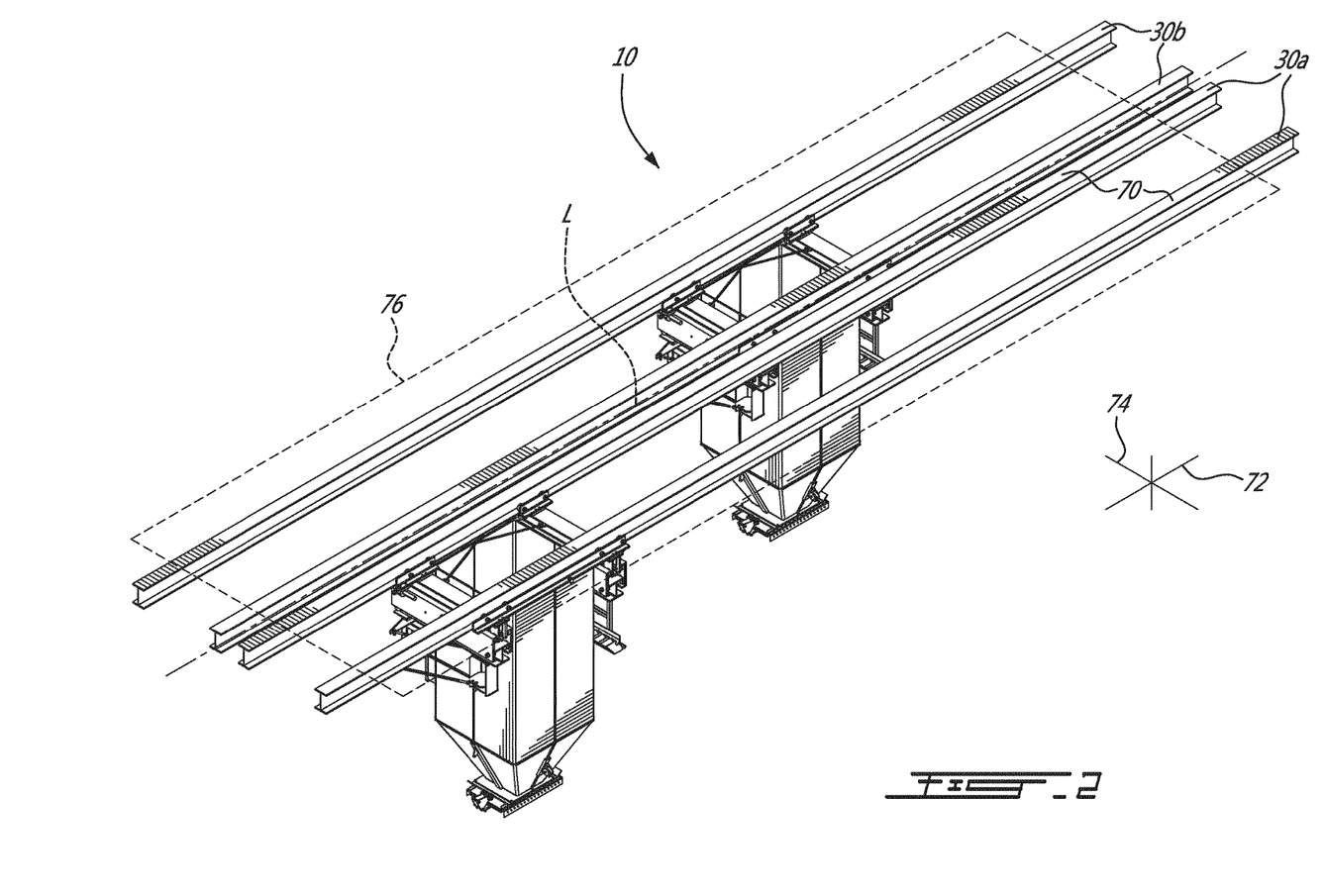
FIG. 2 is an oblique view of the dispensing system of FIG. 1.

More specifically, referring to FIG. 2, in a first examplary embodiment of the dispensing system 10, the dispensing system 10 uses two adjacent main guides 30a, 30b, each one of the two adjacent main guides having a pair of guide rails 70 oriented in an orientation corresponding to a length of the vehicle, and which will be referred to herein as the longitudinal, or X, axis 72. The main guides 30a, 30b, will also be referred to as longitudinal guides.

Each one of the two longitudinal guides 30a, 30b has one or more carriage movably mounted therealong and supporting a corresponding hopper. The hoppers can thus be moved in a horizontal plane, along the longitudinal axis 72 by moving the corresponding carriage along the corresponding guide. The carriages each have a corresponding secondary guide. The secondary guide is oriented transversally to the length of the vehicle and can be thus said to be along a transverse, or Y axis 74. The secondary guides will also be referred to as transverse guides. Each hopper can be moved along the transverse axis 74 along the secondary guide of the carriage. Henceforth, the combination of the longitudinal guides and transverse guides allows each hopper to be moved to any combination of transversal (Y) and longitudinal (X) coordinates within the horizontal hopper movement area 76, as long as another hopper does not already occupy the coordinates.

For illustrative purposes, in the embodiment illustrated in FIGS. 1 and 2, two 2.5 metric ton hoppers are used on corresponding primary guides, which was found suitable for some mills. In alternate embodiments, each primary guide can have more than one hopper, such as two hoppers for instance which leads to a total of 4 hoppers, or even more hoppers. Alternately, alternate embodiments can include a single primary guide rather than two primary guides, and the single primary guide can have one or more hopper.

Figure 3:
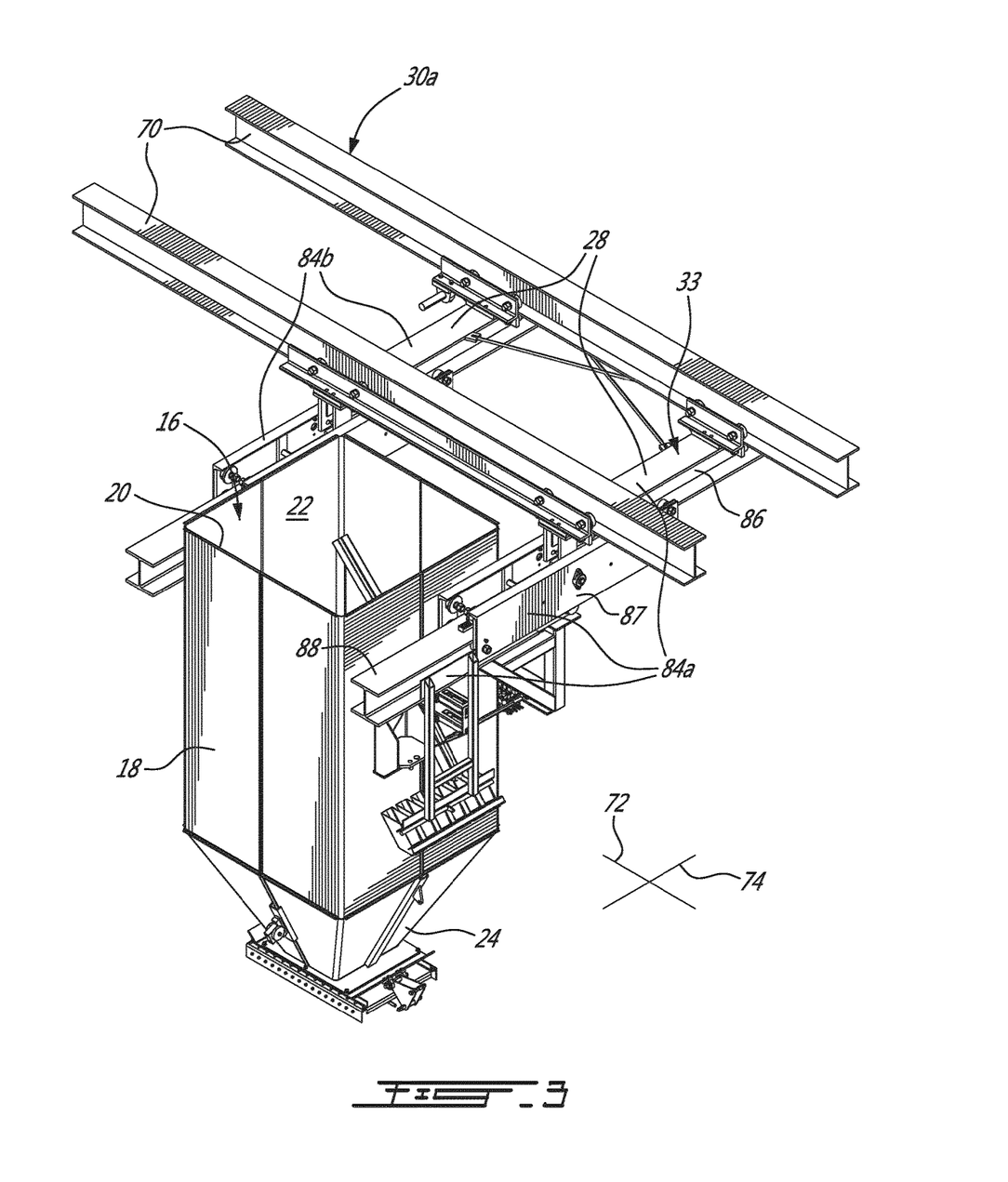
FIG. 3 is an oblique view, from above, showing a hopper in an extended position.

FIG. 3 shows an example of a transversal guide which can be used and along which the hopper has been transversally extended to a cantilevered position. The hopper comprises a body 18 adapted to receive, transport, and dispense the bulk material. For this purpose, the body 18 comprises an open end 20 which, in this embodiment, has a square shape with four upper edges which define an upper opening 22 that enables the bulk material to be loaded into the hopper 16. In alternate embodiments, the shape and configuration of the upper opening 22 can vary. The body 18 terminates with a downwardly extending hopper chute 24 having a bottom opening 26 (best seen in FIG. 4) for unloading the bulk material therethrough. The bottom opening 26 has a gate 27 that can be selectively opened and closed. When the gate is closed, flow of the bulk material through the bottom opening 26 is prevented and the hopper can be loaded; whereas the bulk material may freely flow through the bottom opening 26 and be dispensed when the gate is opened.

Figure 4:
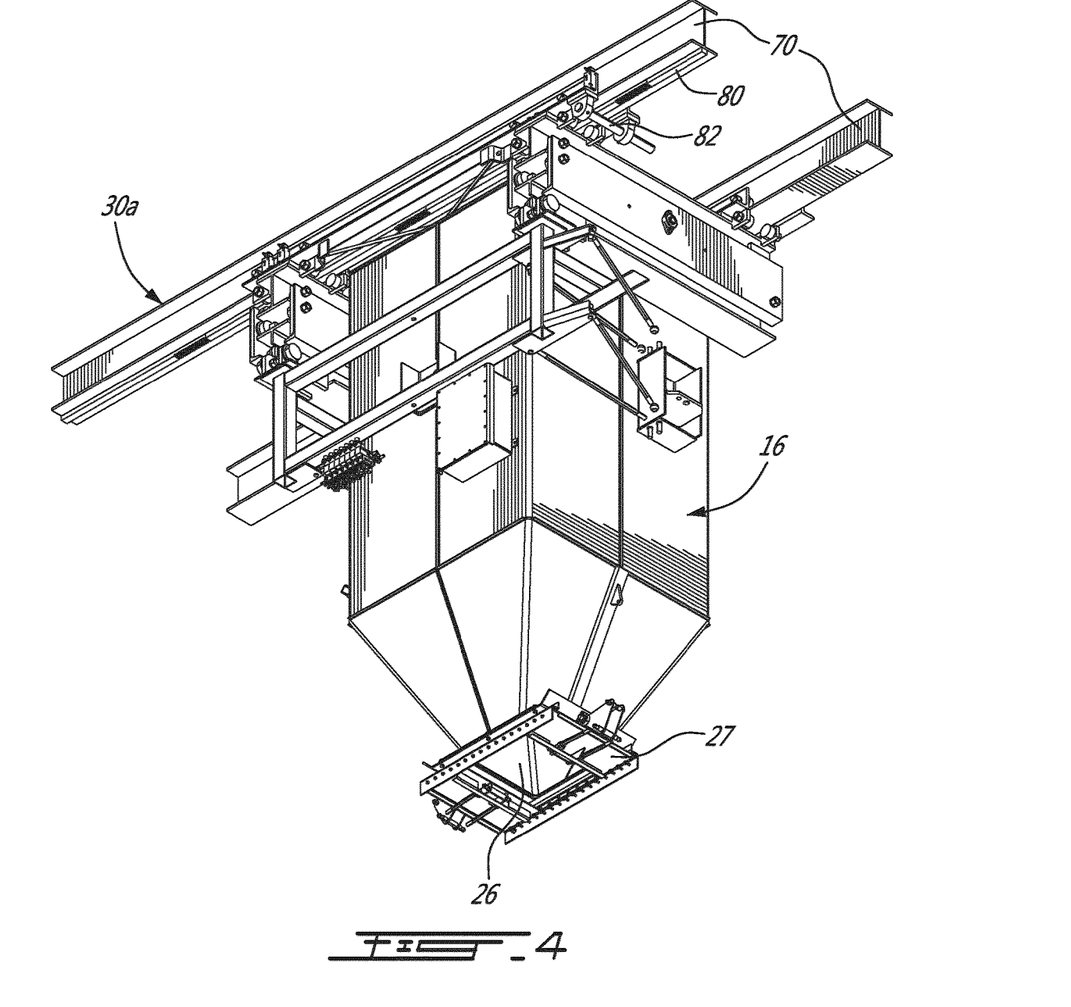
FIG. 4 is an oblique view, from below, showing a hopper in a retracted position.

Referring to FIGS. 3 and 4, it can be seen that each carriage has an associated longitudinal movement mechanism adapted to move the carriage 33 longitudinally along the longitudinal guide 30. In this embodiment, the longitudinal movement mechanism includes a motorized pinion (not shown) which is made integral to the carriage 33, and which is engaged with a longitudinally oriented rack 80 made integral to one of the guide rails 70 (i.e. the rack 80 has teeth intermeshed with teeth of the pinion). A rack and pinion arrangement is preferred to a wheel and flat rail arrangement because the rack and pinion arrangement can allows to monitor the exact position of the carriage 33 along the longitudinal guides 30 with greater precision, which can be done using an encoder for instance. It will be noted that the rack 80 is provided only along one guide rail in this embodiment, and that the pinion (not shown) is provided on a shaft 82 connected to a motor (not shown) and positioned below the rack 80 rather than above the rack, which can allow to reduce or prevent undesirable accumulation of material between the rack 80 and the pinion.

In the embodiment shown in FIGS. 3 and 4, the secondary guide 28 is configured to allow the hopper 16 to extend and retract transversally relative to the main guide 30a, between a cantilevered position shown in FIG. 3 and a retracted position shown in FIG. 4. To this end, the secondary guide 28 is provided with two sets of slidingly extendible guide rails 84a, 84b, each having three transversally oriented sections including a first section 86 directly mounted to the main guide 30a and longitudinally slidable therealong, a second section 87 slidably mounted to and extendible from the first section, and a third section 88 which is slidable mounted to and extendible from the second section and which receives the hopper 16. The extension of the second and third sections is controlled via a rack and pinion arrangement, via a motor, and has an encoder to allow precise monitoring of the exact position. Henceforth, in the illustrated embodiment, each rack and pinion arrangement is associated to a motor and an encoder completing corresponding movement mechanisms allowing the controller to control the transversal and longitudinal movement of each hopper with a high degree of precision. This arrangement is an example of an arrangement which can confer sufficient mechanical resistance to the system when a full hopper is fully extended in a cantilevered position.

Figure 5:
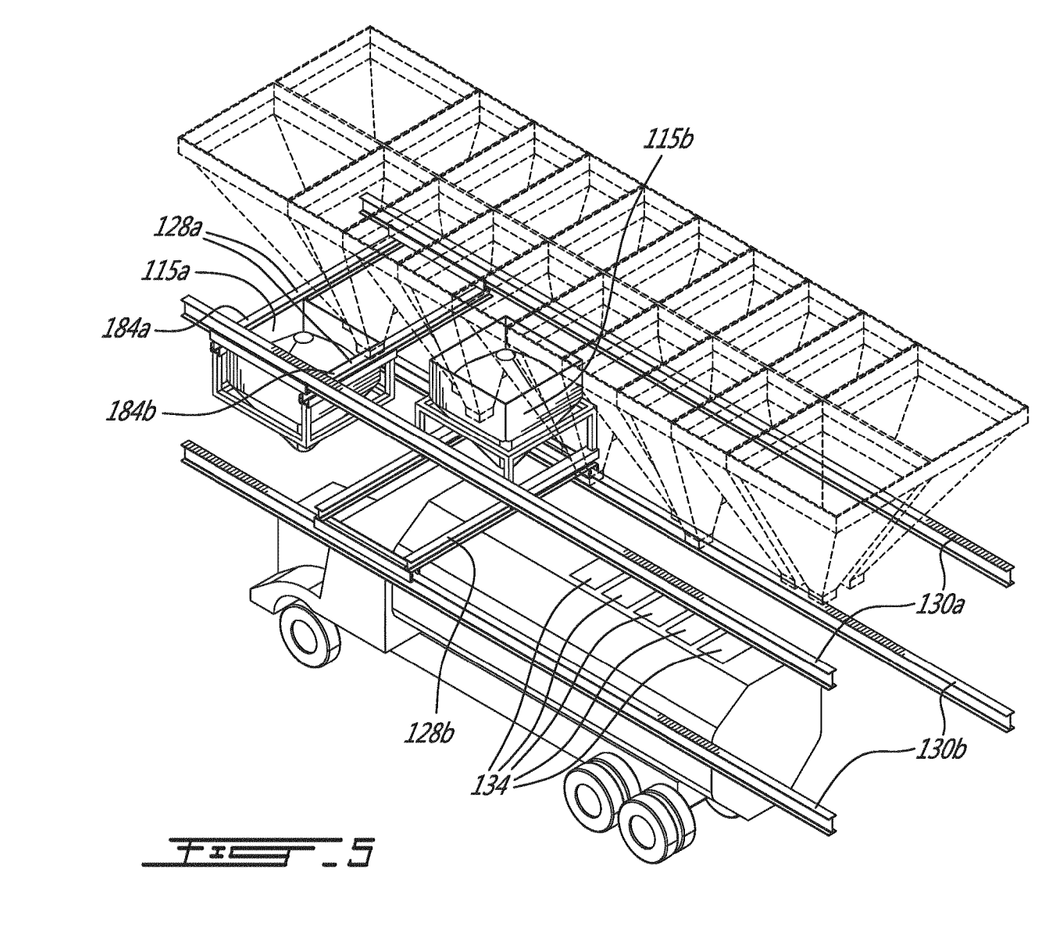
FIG. 5 is a variant to the dispensing system of FIG. 2.

FIG. 5 shows an alternate embodiment where the hopper 115a is not transversally extendible, but transversally slidable along associated guide rails 184a, 184b. More specifically, the transversal guide 128a includes two guide rails 184a, 184b which are collectively movable along the longitudinal guide 130a, and the hopper 115a is movable along the transversal guide 128. In order to maintain full liberty of movement, the longitudinal guides 130a, 130b are mounted vertically adjacent one another (i.e. superposed), and both hoppers 115a, 115b are located in the hopper movement area located between the two longitudinal guides 130a, 130b. More specifically still, the transversal guide 128a is mounted below the longitudinal guide 130a, and the hopper 115a is received below the transversal guide 128a, while the transversal guide 128b is mounted above the longitudinal guide 130b and the hopper 115b is mounted above the transversal guide 128b. FIG. 5 also schematically depicts the compartments 134 in the transport truck where the bulk material is unloaded from the hoppers 115a, 115b.

In the illustrated embodiments, movement of each hopper 16 in a horizontal plane, in both the longitudinal and transversal orientation, is provided for, which allows to position the hoppers 16 in any position in the hopper movement area, for loading or dispensing the bulk material. For example, the hoppers 16 may be positioned in vertical alignment with a bulk material chute 32 of any one of the plurality of silos 12 in order to load bulk material therefrom. Controllable electromotors (not shown) may also be coupled to each hopper 16 to enable movement thereof along the guides 28, 30.

Referring back to FIG. 3, each hopper is mounted to the transversal guide 28 via a scale in this embodiment. The scale can have one or more load cell for monitoring the weight of the bulk material loaded in each hopper. The weighing device can provide a feedback of the hopper's actual weight for ensuring that a desired quantity of the bulk material is loaded into the hopper $16_1$, $16_2$ and, in turn, unloaded into the truck 14. It should be understood that other means of weighing the bulk material loaded in the hoppers 16 may also be used.

A suitable software can allow a controller to move the hoppers 16 along both the X and Y axes in a manner to avoid one another, so as to prevent collisions from occurring while maintaining a very high level of liberty of movement to each hopper, and can further allow to move the hoppers in circular motions in a horizontal plane while they are being loaded in order to spread the bulk material therein (e.g. somewhat reduce the conical shape of bulk material resulting from loading by a chute).

Different hoppers 16 can operate simultaneously with little or no timeout, either to load or unload the bulk material. Uninterrupted use of the hoppers 16 may therefore be achieved, which can be a significant advantage in embodiments where the acceleration and speed of the hoppers is limited. For example, a first one of the hoppers 16 may load bulk material from one of the silos 12 while another one of the hoppers 16, which has already been loaded with the bulk material, may simultaneously unload the bulk material into the truck 14, potentially allowing to dispense bulk material to a given bulk receiving area twice as fast. The movement of the transversal guide along the corresponding longitudinal guide, the movement of the hopper along the transversal guide, and the opening and closing of the gates can be controlled by a controller. The controller can receive information concerning the position of all hoppers and control movement thereof taking the position of all hoppers and objectives to be achieved into consideration, in order to avoid collisions. Accurate position information can be provided to the controller when rack and pinion mechanisms are used and are combined with en encoder, for instance, which is currently preferred over wheel and flat rail arrangements which can become unsynchronized more easily.

It will be understood that a pair, or more, hoppers may indeed be in operation simultaneously to supply individiual compartments provided in the bed of the truck 14 for instance. The compartments may be sealed off from one another and each associated with an input opening (not shown) adapted to allow the bulk material to flow therethrough.

In a typical plant, a system will be used to determine the position of the transport vehicle and of its associated bulk material receiving areas. The resulting signal can be communicated to the controller for the controller to direct the movement of the hoppers accordingly.

A typical transport truck can include a plurality of compartment openings all aligned along the length of the truck bed, in a center thereof. As the bulk material may be of the same type or have different parameters, such as composition, granulometry, protein content, moisture content, or the like, from one plant chute to the other, segregation of the bulk material within separate compartments of the truck 14 may be desirable. The segregation of the bulk material between the chutes 12 and/or compartments may also depend on any other parameter, e.g. convenience, relevant to the plant operator.

The chutes 12 may further be arranged in a configuration suitable for efficient loading and unloading of the bulk material. Illustratively, the chutes 12 are arranged in two chute rows 36a and 36b provided on either side of the central vertical of the truck. Any one of the movable hoppers 16 may be moved to a position adjacent either one of the two rows 36a and 36b for accessing chutes 12 in either row 36a or 36b. The body 18 of each one of the hoppers 16 may then be loaded with bulk material exiting the bulk material chute 12 of the selected receptacle 15.

Since each movable hopper 16 can be positioned underneath the bulk material chute 32 of row 36a or 36b, the chute 26 of each hopper 16 is transversally offset from the central vertical plane of the truck 14 during loading of the bulk material into the hoppers 16. The latter may then be moved along at least one of the X and Y axes in order to position the bulk material chute 26 of any one of the hoppers 16 about to discharge the bulk material into the bed of the truck 14 along the central vertical plane. In this manner, the bulk material may be unloaded through the input openings associated with corresponding compartments. A hopper 16 positioned adjacent the bulk material chute 32, may for example move independently from the other hopper 16 along the transversal guides 28 in the transversal orientation 74 towards the central axis L of the truck 14 to reach a suitable unloading position. Although not illustrated, the hopper 16 may also move along the X axis 72 by sliding along the longitudinal guides 30 to further position the bulk material chute 26 of the hopper 16 adjacent the input opening of a selected one of the compartments (e.g. compartments 134, FIG. 5).

While a first hopper 16 is unloading the bulk material into the selected one of the compartments, a second hopper 16 may move independently from the first hopper 16 along the guides 28 and 30 to reach a position along the central vertical plane of the truck 14 and in turn enable unloading of the bulk material into the compartments. The transversal movement and the longitudinal movement can be done one after the other, or both at the same time, at different or same speeds.

To avoid collisions between hoppers, the controller can move hoppers to give way to other hoppers. These movements can be controlled by a controller via an appropriate software application.

Figure 6:
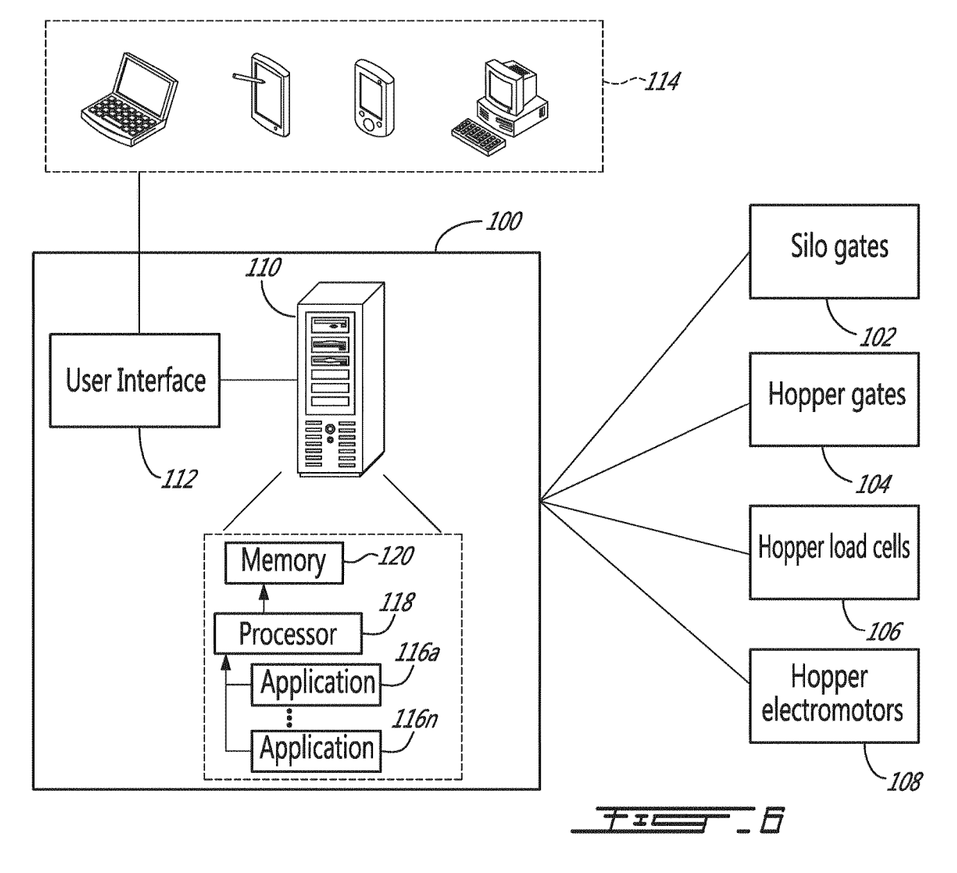
FIG. 6 is a schematic diagram of a control system in accordance with an illustrative embodiment.

Referring to FIG. 6, although the various steps of the process of loading and unloading the bulk material may be effected manually by an operator using pushbuttons, cranks, levers, or other actuators known to those skilled in the art, the process can alternately be semi- or fully automated. For this purpose, a control system 100, or controller, may be used to schedule the movement of the hoppers 16 so that fast and efficient loading and unloading of the bulk material may be achieved. The efficiency of the process may be optimized according to a client delivery docket stating the unloading sequence of the truck 14 at a client's location.

The control system 100 may be electrically connected, e.g. by signal lines (not shown), to gates 102, 104 respectively provided at the bulk material chute 12 and at the bottom opening 26 of each hopper 16, to load cells 106 of the hoppers 16, and to motors 108 driving the hoppers 16. The control system 100 illustratively comprises one or more server(s) 110, which may be accessed via a user interface 112 by a user using a client device 114, such as a computer, personal digital assistant (PDA), or the like, adapted to communicate with the server 110. The user interface 118 may comprise a plurality of user interaction devices, including, but not limited to, a keyboard, a touchscreen, and a mouse (not shown).

The server 110 may comprise, amongst other things, a plurality of applications 116a . . . 116n running on a processor 118 coupled to a memory 120. It should be understood that while the applications 116a . . . 116n presented herein are illustrated and described as separate entities, they may be combined or separated in a variety of ways. The processor 118 may access the memory 120 to retrieve data. The processor 118 may be any device that can perform operations on data. Examples are a central processing unit (CPU), a front-end processor, and a microprocessor. The applications 116a . . . 116n are coupled to the processor 118 and configured to perform various tasks as explained below in more detail. An output representative of the tasks performed may be transmitted to the client device 114.

The memory 120 accessible by the processor 118 may receive and store data. The memory 120 may be a main memory, such as a high speed Random Access Memory (RAM), or an auxiliary storage unit, such as a hard disk, a floppy disk, or a magnetic tape drive. The memory 204 may be any other type of memory, such as a Read-Only Memory (ROM), or optical storage media such as a videodisc and a compact disc. One or more databases (not shown) may be integrated directly into the memory 120 or may be provided separately therefrom and remotely from the server 110. In the case of a remote access to the databases, access may occur via any type of network (not shown). The various databases may be provided as collections of data or information organized for rapid search and retrieval by a computer. The databases may be structured to facilitate storage, retrieval, modification, and deletion of data in conjunction with various data-processing operations. The databases may consist of a file or sets of files that can be broken down into records, each of which consists of one or more fields. Database information may be retrieved through queries using keywords and sorting commands, in order to rapidly search, rearrange, group, and select the field. The databases may be any organization of data on a data storage medium, such as one or more servers.

Figure 7:
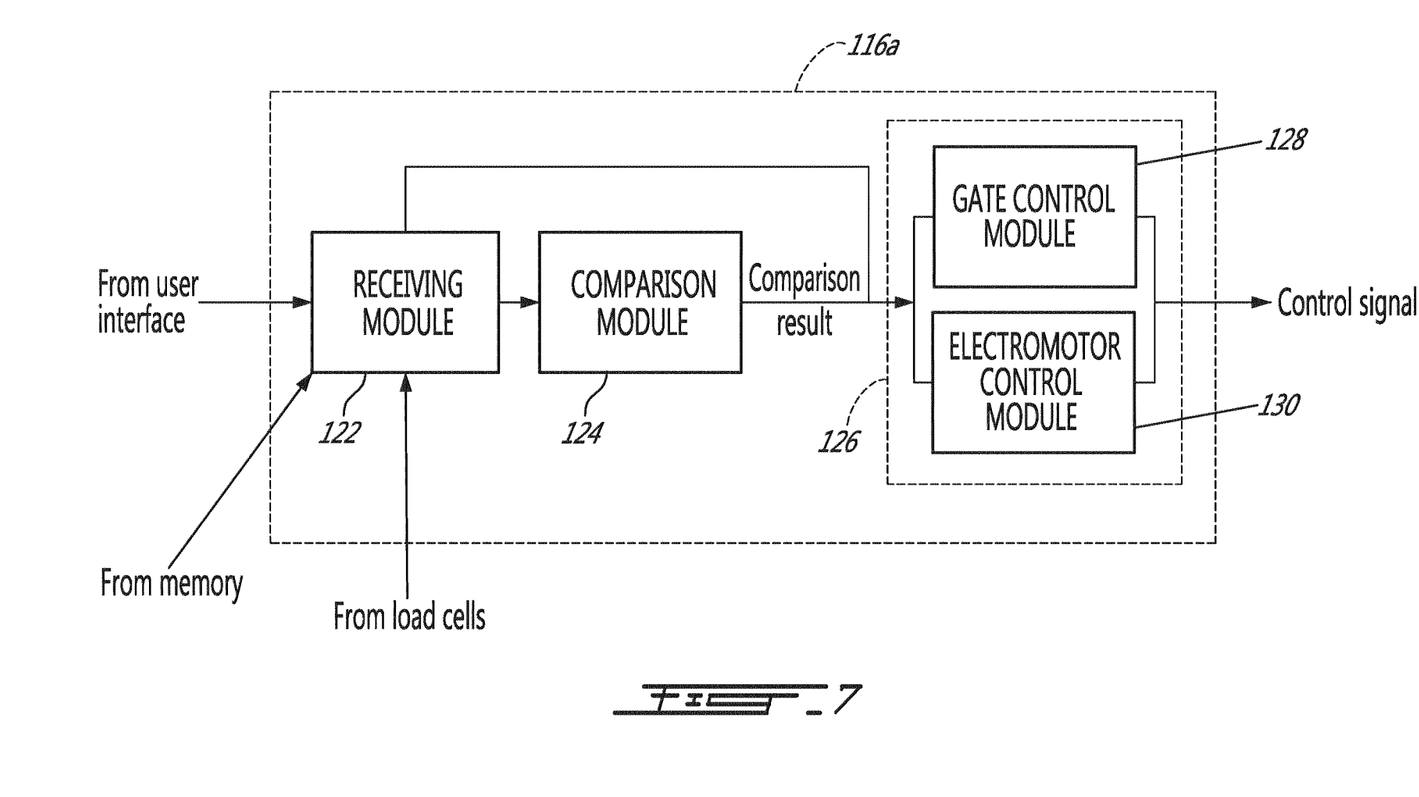
FIG. 7 is a schematic diagram of an application running on the processor of FIG. 6.

FIG. 7 is an exemplary embodiment of an application 116a running on the processor 118. The application 116a illustratively comprises a receiving module 122, a comparison module 124, and a command generation module 126 comprising a gate control module 128 and an electromotor control module 130. When in the fully automated mode, the control system 100 may fully schedule the opening and closing of the gates 102, 104 as well as the movement of the hoppers 16 along the rails 28, 30 during the loading and unloading of the bulk material, and this without user intervention during the process. For this purpose, the receiving module 122 may retrieve from the memory 120 a client delivery docket stored therein and extract data associated with such a docket. The data may comprise a desired type and quantity of bulk material to be unloaded into the truck 14 as well as the specific compartments 134 the bulk material is to be unloaded into. The extracted data may then be sent to the command generation module 126 for generating control signals to the gates 102, 104 and the electromotors 108.

In particular, when it is desired to load the bulk material into a given hopper 16, the gate control module 128 may first issue a control signal to the electromotors 108 associated to the given hopper 16 to move the latter to a position where the upper opening 22 of the hopper 16 is vertically aligned with a selected bulk material chute 12. Once the hopper 16 is in position, the gate control module 128 may issue a control signal to the gate 102 coupled to the bulk material chute 12 so as to enable a flow of the bulk material into the body 18 of the hopper 16. The receiving module 122 may then receive weight signals from the load cell(s) 106 coupled to the hopper 16, the weight signals representative of a measurement of the present weight of the bulk material loaded into the hopper 16. In this manner, the control system 100 may monitor the weight of the hoppers 16 and control the opening and closing of the silo gates 102 so as to achieve the loading of a desired amount of the bulk material in each hopper 16, while maintaining the hopper gates 104 closed. The opening of the hopper gates (discharging of the hopper) may further be controlled on the basis of the determination that the hopper 16 has reached the position of alignment with the transport vehicle compartment.

The receiving module 122 may for this purpose send the received weighing measurement to a comparison module 124. The comparison module 124 may then compare the received measurement to a predetermined threshold, e.g. a desired weight, stored in a memory 120 in order to determine whether the hopper 16 has reached the desired quantity of bulk material. The comparison result may then be sent to the command generation module 126. If the hopper 16 has not reached the desired weight of bulk material, the gate control module 128 may send a control signal to the gate 102 to maintain the latter in an open position until the hopper 16 is filled to a desired weight. Otherwise, the gate control module 128 may send a control signal to the gate 102 coupled to the bulk material chute 32 for closing the latter, thus interrupting the filling process. The electromotor control module 130 may also send a signal to the electromotor 108 coupled to the hopper 16 for adjusting a position of the latter along the X and Y axes towards the input opening of a selected vehicle compartment 34. Once the hopper 16 is in position, as can be determined from feedback from the electromotor 108, the gate control module 128 may send a control signal to open the gate 104 coupled to the bottom opening 26 of the hopper 16, thereby enabling a flow of the bulk material into the bed of the truck 14. Another signal may subsequently be sent to close the gate 104 once the bulk material has been unloaded. If it is desired to fill a compartment with additional bulk material or fill another compartment of the transport vehicle, the process may be repeated with the same or another hopper 16.

In the semi-automated mode, the operator may issue via the user interface 112 a command to a specific hopper 16 for loading a specific weight of a specific type of bulk material. The control system 100 may then control the movement of the hopper 16 along the X and Y axes to load the requested bulk material from a given silo 12 as well as to prevent collisions with any other hoppers 16, which may be in operation. The control system 100 may control movement of the hopper 16 until the bulk material requested by the operator is unloaded into the truck 12. In particular, the user input command received at the receiving module 122 may be sent to the command generation module in order to issue control signals to the gates 102, 104 and electromotors 108, as described above when referring to the fully automated mode. Feedback from the load cells 106 may further be received at the receiving module 122 and sent to the comparison module 124 for prompting the gate control module 128 to close the gates 102, 104 once the bulk material has been fully loaded from the silo 12 into the hopper 16 then unloaded from the hopper 16 to the truck compartment 34.

The above description is meant to be exemplary only, and one skilled in the art will recognize that changes may be made to the embodiments described without departing from the scope of the invention disclosed. For instance, the bulk material can be hardware or pills of the pharmaceutical industry for instance, and the system can be adapted to the bulk material it is intended to handle such as by miniaturizing in order to discharge pills from one or more pill chutes into one or more pill containers, to give one example. It will be understood that the illustrated embodiments have longitudinal guides which are significantly longer than the transversal guides, the dimensions of the guides being associated to the shape of the vehicle receiving area and of the position of the bulk discharge chutes. In alternate embodiments, the relative length between the longitudinal guides and the transversal guides can vary. The scope is indicated by the appended claims.

The invention claimed is:

1. A dispensing system for dispensing bulk material in a plant having a plurality of bulk material chutes above a transport vehicle area, the system comprising:
   at least one longitudinal guide;
   a plurality of transversal guides each mounted to a corresponding longitudinal guide via a longitudinal movement mechanism and being movable along a longitudinal axis,
   a plurality of hoppers, each hopper being mounted to a corresponding transversal guide and being movable transversally along the corresponding transversal guide via a transversal movement mechanism, each hopper having an open upper end, a chute opposite the upper end, and a gate allowing to selectively open and close the chute; and
   a controller configured to individually move each of the hoppers in a hopper movement area located between the bulk material chutes and the transport vehicle area, both along the transversal axis via the transversal movement mechanism and along the longitudinal axis via the longitudinal movement mechanism, the controller being further configured to selectively open and close the gates; wherein each hopper can be moved to a corresponding position of alignment with a selected bulk material chute with its gate closed to receive a given quantity of bulk material therefrom, and then moved to a position of alignment with a selected bulk receiving area where the gate can be opened to dispense the given quantity of bulk material, independently of the movement of the other hoppers.

2. The dispensing system of claim 1 wherein each hopper has a scale mounted between a corresponding hopper and a corresponding transversal guide in a manner to weigh the quantity of bulk material received in the corresponding hopper.

3. The dispensing system of claim 2 wherein the scales are connected to the controller, and the controller further controls the plurality of bulk material chutes based on the weighed quantity of bulk material.

4. The dispensing system of claim 1 comprising two longitudinal guides each having at least one associated transversal guide, wherein the hopper movement area is a common, rectangular, and horizontal movement area and each one of the hoppers are movable at any position in the hopper movement area.

5. The dispensing system of claim 1 wherein the hoppers are fixedly mounted to an end of corresponding ones of the transversal guides, the end of the transversal guides being extendible along a transversal axis.

6. The dispensing system of claim 1 wherein the hoppers are mounted to corresponding ones of the transversal guides via the transversal movement mechanism.

7. The dispensing system of claim 1 wherein each one of the longitudinal guides and the transversal guides includes a pair of guide rails.

8. The dispensing system of claim 7 wherein at least one of the guide rails of each pair includes a rack, wherein the longitudinal movement mechanism and the transversal movement mechanism include at least one pinion engaged with each rack.

9. The dispensing system of claim 8 wherein the pinions are positioned below the racks.

10. The dispensing system of claim 8 further comprising encoders associated to each rack and pinion engagement and connected to the controller.

11. The dispensing system of claim 1 wherein the controller is configured to determine the position of a vehicle in the transport vehicle area, and a position of a bulk receiving area associated to the vehicle.

12. A bulk material dispenser, the bulk material dispenser comprising:
    at least one first guide oriented along a first axis;
    at least one second guide oriented along a second axis, each second guide being mounted to a corresponding first guide and movable along the first axis via a first movement mechanism;
    at least one hopper, each hopper being mounted to a corresponding second guide and movable along the second guide via a second movement mechanism, each hopper having an open upper end, a chute opposite the upper end, and a gate allowing to selectively open and close the chute;
    a hopper movement area spanning a length of the second guide along a length of the first guide; and
    a controller configured to individually move each hopper in the hopper movement area via the first movement mechanism and the second movement mechanism, the controller being further configured to selectively open and close the corresponding gate.

13. The dispensing system of claim 12 further comprising at least one scale being mounted between a corresponding hopper and a corresponding second guide in a manner to weigh the quantity of bulk material received in the corresponding hopper.

14. The dispensing system of claim 12 comprising two longitudinal guides each having at least one associated transversal guide, wherein the hopper movement area is a common, rectangular, and horizontal movement area and each one of the hoppers are movable at any position in the hopper movement area.

15. The dispensing system of claim 14 wherein each one of the longitudinal guides and the transversal guides includes guide rails.

16. The dispensing system of claim 15 wherein at least one of the guide rails of each pair includes a rack, and both the first movement mechanism and the second movement mechanism include at least one pinion engaged with each rack.

17. A method of dispensing bulk material, the method comprising:
    selecting a bulk material chute amongst a plurality of bulk material chutes arranged in two parallel and adjacent rows, each row extending longitudinally;
    positioning a hopper below the selected bulk material chute;
    feeding a given quantity of bulk material from the bulk material chute into the positioned hopper, thereby loading the hopper;
    moving the loaded hopper in the horizontal plane, both longitudinally and transversally, into vertical alignment with a bulk receiving area, including moving the loaded hopper both longitudinally and transversally at the same time; and
    dispensing the loaded bulk material from the hopper into the bulk receiving area.

18. The method of claim 17 further comprising:
    identifying a presence of a transport vehicle in a transport vehicle area, and longitudinal and transversal coordinates of a plurality of bulk receiving areas in the transport vehicle;
    identifying a selected one of the bulk receiving areas;
    wherein the moving includes moving the loaded hopper into vertical alignment with the selected one of the bulk receiving areas.

19. The method of claim 17 wherein the step of feeding includes:
    weighing a quantity of material received in the hopper;
    stopping the feeding when the given quantity of bulk material is determined to have been reached based on said weighing.

20. The method of claim 17 further comprising moving the hopper in the horizontal plane, both longitudinally and transversally, during at least one of the steps of feeding and dispensing.

* * * * *